(12) United States Patent  (10) Patent No.: US 9,250,840 B2
Changsong  (45) Date of Patent: Feb. 2, 2016

(54) IMAGE FORMING APPARATUS CAPABLE OF EXECUTING APPLICATIONS, IMAGE FORMING METHOD, AND RECORDING MEDIUM

(71) Applicant: KYOCERA Document Solutions Inc., Osaka (JP)

(72) Inventor: Sun Changsong, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/261,423

(22) Filed: Apr. 25, 2014

(65) Prior Publication Data

US 2014/0320917 A1 Oct. 30, 2014

(30) Foreign Application Priority Data

Apr. 25, 2013 (JP) .................................. 2013092268

(51) Int. Cl.
*G06F 3/12* (2006.01)
*H04N 1/00* (2006.01)
*G06F 9/445* (2006.01)

(52) U.S. Cl.
CPC ............ *G06F 3/1237* (2013.01); *G06F 3/1203* (2013.01); *G06F 3/123* (2013.01); *G06F 3/1211* (2013.01); *G06F 3/1285* (2013.01); *G06F 9/445* (2013.01); *H04N 1/00* (2013.01)

(58) Field of Classification Search
None
See application file for complete search history.

(56) References Cited

U.S. PATENT DOCUMENTS

| | | | |
|---|---|---|---|
| 2002/0054326 A1* | 5/2002 | Morita | 358/1.15 |
| 2003/0063316 A1* | 4/2003 | Irino | 358/1.16 |
| 2004/0075857 A1* | 4/2004 | Akiyoshi et al. | 358/1.13 |
| 2004/0111462 A1* | 6/2004 | Minato | 709/200 |
| 2005/0108277 A1* | 5/2005 | Arrouye | G06F 9/461 |
| 2006/0195476 A1* | 8/2006 | Nori et al. | 707/104.1 |
| 2007/0288284 A1* | 12/2007 | Shimmoto | 705/8 |
| 2010/0149583 A1* | 6/2010 | Tian | 358/1.15 |
| 2013/0242335 A1* | 9/2013 | Naitoh | 358/1.14 |
| 2013/0333021 A1* | 12/2013 | Sellers et al. | 726/17 |

FOREIGN PATENT DOCUMENTS

| | | |
|---|---|---|
| JP | 2004112785 A | 4/2004 |
| JP | 2007-329743 A | 12/2007 |
| JP | 2009-276936 A | 11/2009 |

* cited by examiner

*Primary Examiner* — Beniyam Menberu
(74) *Attorney, Agent, or Firm* — Hawaii Patent Services; Nathaniel K. Fedde; Kenton N. Kedde

(57) ABSTRACT

Provided is an image forming apparatus that allows information to be shared between applications, while lowering the security risk. With this image forming apparatus, a service acquisition portion references the class information of applications at the time of installation of them to acquire services from a server, or the like. A service registration unit associates the services acquired by the service acquisition portion with the respective applications to store them in a service registry. Upon one of the application being executed, an information sharing control portion uses the shared data to cause the information to be shared with the other services on the basis of the management information of the services associated with the applications by the service registration portion.

3 Claims, 9 Drawing Sheets

IMAGE FORMING APPARATUS CAPABLE OF EXECUTING APPLICATIONS, IMAGE FORMING METHOD, AND RECORDING MEDIUM

INCORPORATION BY REFERENCE

This application is based on and claims the benefit of priority from Japanese Patent Application No. 2013-092268 filed on Apr. 25, 2013, the contents of which are hereby incorporated by reference.

BACKGROUND

The present disclosure relates to an image forming apparatus, an image forming method, and a recording medium, and particularly to an image forming apparatus capable of executing applications, an image forming method, and a recording medium in which a program thereof are recorded.

A typical image forming apparatus, such as a Multifunctional Peripheral (MFP), can print a document or an image, and can install and execute applications.

With these applications, such functions as PDF preparation, name card management, and book keeping, can be added to the image forming apparatus. Further, with an application, cooperation with a piece of external equipment, such as a network camera, can also be performed.

The typical image forming apparatus that includes a storage unit for storing such applications, and uses various applications stored in the storage unit to perform image process.

SUMMARY

An image forming apparatus of the present disclosure executing a plurality of applications stored in a storage unit. A service acquisition portion acquires a callable service in a share from the plurality of applications stored in the storage unit. A service registration portion stores the service acquired by the service acquisition portion in the storage unit in association with one of the plurality of applications. An information sharing control portion causes information provided by the service associated by the service registration portion to be shared between the other service stored in the storage unit.

An image forming method of the present disclosure is an image forming method, being implemented by the image forming apparatus executing a plurality of applications stored in a storage unit. The method acquires a callable service that is used in a share by the plurality of applications stored in the storage unit. Further, the method stores the acquired service that is in association with one of the plurality of applications in the storage unit. Further, the method shares information provided by the service associated with the other service stored in the storage unit.

A recording medium of the present disclosure is a non-transitory computer-readable recording medium, causing an image forming apparatus executing a plurality of applications stored in a storage unit. The program functions as a service acquisition portion configured to acquire a callable service that is used in a share by the plurality of applications stored in the storage unit. The program also functions as a service registration portion configured to store the service acquired by said service acquisition unit in said storage unit in association with one of the plurality of applications. The program also functions as an information sharing control portion configured to share information provided by the service registration portion to be shared between the other service stored in the storage unit.

DETAILED DESCRIPTION

<Embodiment>
[Configuration of Image Forming Apparatus 1]

First, with reference to FIG. 1, a configuration of an image forming apparatus 1 according to the present disclosure will be explained in detail.

Figure 1:
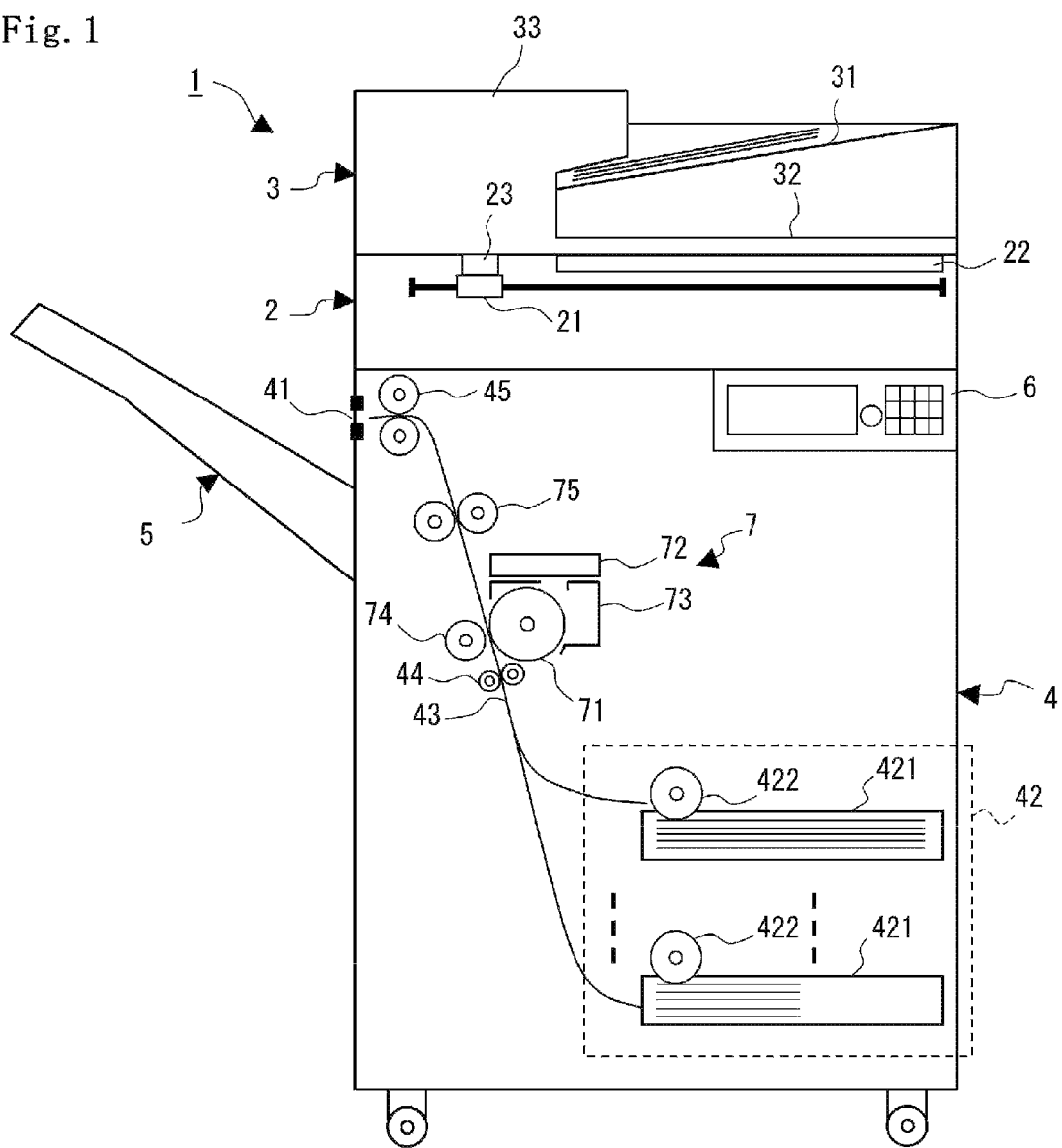
FIG. 1 is a schematic diagram illustrating an internal configuration of an image forming apparatus according to the present disclosure.

Referring to FIG. 1, the image forming apparatus 1 includes a document reading unit 2, a document feeding unit 3, a main unit 4, a stack tray 5, and an operation panel unit 6.

The document reading unit 2 is disposed on top of the main unit 4, and the document feeding unit 3 is disposed on top of the document reading unit 2. The stack tray 5 is disposed on the side of a delivery port 41 for recording sheets that is formed in the main unit 4, and the operation panel unit 6 is disposed on the front side of the image forming apparatus 1.

The document reading unit 2 includes a scanner 21, a platen glass 22, and a document reading slit 23. The scanner 21 is constituted by an exposure lamp, an imaging sensor, and the like, being configured to be movable in a direction of conveyance of a document by the document feeding unit 3. The platen glass 22 is a document table formed of a transparent material, such as a glass. The document reading slit 23 has a slit that is formed in a direction orthogonal to the direction of conveyance of a document by the document feeding unit 3.

When the scanner 21 is to read a document placed on the platen glass 22, it is moved to a position opposed to the platen glass 22, and reads the document placed on the platen glass 22 while scanning the document for acquiring image data, outputting the acquired image data to the main unit 4.

Further, when the scanner 21 is to read a document carried by the document feeding unit 3, the scanner 21 is moved to a position opposed to the document reading slit 23, and reads the document through the document reading slit 23 in synchronization with the document carrying operation of the document feeding unit 3 for acquiring image data, outputting the acquired image data to the main unit 4.

The document feeding unit 3 includes a document mounting unit 31, a document discharge unit 32, and a document carrying mechanism 33. The documents placed in the document mounting unit 31 are fed in turn one by one by the document carrying mechanism 33 to be carried to a position opposed to the document reading slit 23, and thereafter are discharged into the document discharge unit 32. The document feeding unit 3 is configured to be tiltable, and by bringing the document feeding unit 3 upward, the top face of the platen glass 22 can be opened.

The main unit 4 includes an image forming unit 7, and also includes a paper feeding unit 42, a paper carrying passage 43, conveyance rollers 44, and discharge rollers 45. The paper feeding unit 42 includes a plurality of paper feeding cassettes 421 for storing recording sheets that are different in size or orientation, respectively, and a feed roller 422 for feeding the recording sheets one by one from the paper feeding cassette 421 to the paper carrying passage 43.

The feed roller 422, the conveyance rollers 44, and the discharge rollers 45 function as a conveyance unit. The recording sheet is conveyed by this conveyance unit. The recording sheet fed by the feed roller 422 into the paper carrying passage 43 is conveyed by the conveyance rollers 44 into the image forming unit 7.

And, the recording sheet provided with a record by the image forming unit 7 is discharged into the stack tray 5 by the discharge rollers 45.

The operation panel unit 6 includes a display unit; a start key; ten keys; buttons for selecting an operation mode, such as copying, facsimile transmission, and scanner; buttons or a touch panel for giving an instruction related to execution of a job, such as printing, transmission, saving, or recording of the selected document, and the like. In other words, the operation panel unit 6 acquires instructions given by the user for various jobs to be made by the image forming apparatus 1. Further, the operation panel unit 6 also allows each user to input or modify information in account information 90.

The image forming unit 7 includes a photosensitive drum 71, an exposure unit 72, a developing unit 73, a transfer unit 74, and a fixing unit 75.

The exposure unit 72 is an optical unit. The exposure unit 72 exposes the photosensitive drum 71 to form an electrostatic latent image on the surface of the photosensitive drum 71 on the basis of the image data.

The developing unit 73 is a developing unit that uses toner for developing the electrostatic latent image formed on the photosensitive drum 71. The developing unit 73 causes a toner image to be formed on the photosensitive drum 71 on the basis of the electrostatic latent image. The transfer unit 74 causes the toner image formed on the photosensitive drum 71 by the developing unit 73 to be transferred onto the recording sheet. The fixing unit 75 causes the toner image to be fixed on the recording sheet by heating the recording sheet onto that the toner image has been transferred by the transfer unit 74.

{Control Configuration of Image Forming Apparatus 1}

Figure 2:
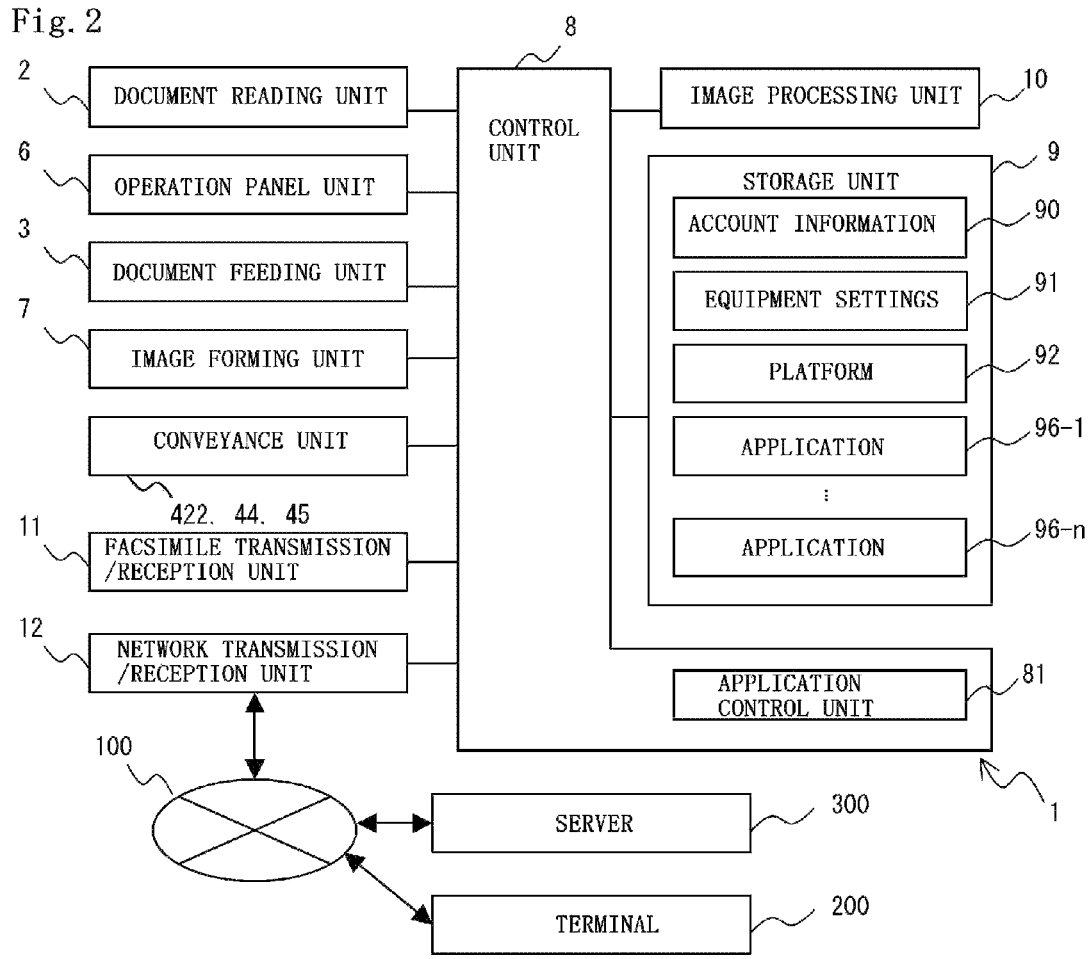
FIG. 2 is a block diagram illustrating a control configuration of the image forming apparatus according to the present disclosure.

Referring to FIG. 2, the document reading unit 2, the document feeding unit 3, the conveyance unit (the feed roller 422, the conveyance rollers 44, and the discharge rollers 45), the operation panel unit 6, and the image forming unit 7 of the image forming apparatus 1 are connected to the control unit 8 to be operation-controlled by the control unit 8. Further, to the control unit 8, a storage unit 9, an image processing unit 10, a facsimile transmission/reception unit 11, a network transmission/reception unit 12, and the like, are connected.

The control unit 8 is an information processing unit. The control unit 8 and the image processing unit 10 read a control program stored in an ROM, and by expanding this control program to an RAM, performs control of the entire apparatus in response to predetermined instruction information inputted from the operation panel unit 6.

Further, the control unit 8 includes an application control unit 81 (a service acquisition unit, a service registration unit, an application sharing control unit, and an application management unit).

The application control unit 81 performs control of installation, execution, uninstallation, and the like, of applications 96-1 to 96-$n$ (application softwares).

The detailed configuration of the application control unit 81 will be described later.

The storage unit 9 uses a storage medium that is non-transitory.

The details of data to be stored in the storage unit 9 will also be described later.

The image processing unit 10 is a control arithmetic unit for image process. The image processing unit 10 performs predetermined image process on the image data. The image processing unit 10 performs various image processes including image improvement processes, such as enlargement/reduction, density adjustment, and gradation adjustment.

The image processing unit 10 is also capable of converting an image read by the document reading unit 2 to a file unit of a format, such as PDF, TIFF, or the like, before storing it in the storage unit 9.

The facsimile transmission/reception unit 11 is a unit that performs transmission/reception of a facsimile. Further, the facsimile transmission/reception unit 11 stores a received facsimile image in the storage unit 9. Further, the facsimile transmission/reception unit 11 can facsimile-transmit image data or printing data stored in the storage unit 9 instead of the image forming unit 7 printing it.

The network transmission/reception unit 12 is a device that is connected to an external network 100. The network transmission/reception unit 12 is connected to a terminal 200 and a server 300 through the network 100. The network transmission/reception unit 12 receives applications 96-1 to 96-$n$ from the terminal 200, and services 94-1 to 94-$n$ from the server 300, also receiving various instructions accompanying them. In other words, the terminal 200 stores the applications 96-1 to 96-$n$, while the server 300 storing the services 94-1 to 94-$n$. Further, the network transmission/reception unit 12 is also capable of transmitting various notices to the terminal 200 and the server 300.

The terminal 200 and the server 300 are capable of giving an instruction for installing or preparing applications 96-1 to 96-$n$ that are executable by the image forming apparatus 1. In addition, the terminal 200 and the server 300 can also perform various controls on the image forming apparatus 1 with an instruction from the user. Further, as described later, the terminal 200 and the server 300 are also capable of developing applications 96-1 to 96-$n$.

In the image forming apparatus 1, the control unit 8, and the image processing unit 10 may be formed as an integral unit.

(Configuration of Storage Unit 9)

Here, about data to be stored in the storage unit 9, there will be given an explanation. The storage unit 9 stores account information 90, equipment settings 91, a platform 92, applications 96-1 to 96-$n$ (application softwares).

The account information 90 is a data base to store various pieces of information for each user's account, such as the user ID, the pass word, the authority information, the IP address of the terminal 200 or server 300, the mail address, the transmission destination, and the address or credit card number.

Each user can previously input various pieces of information about the user to register them into the account information 90 from the operation panel unit 6, the user's terminal, or the like. Further, the user can also be registered as a guest into the account information 90.

The equipment settings 91 include the information about the functions that can be used with the image forming apparatus 1; the equipment specific ID including the serial number, manufacturing number, specific number, and the like; the memory capacity; the printing settings; the number of printed sheets; the charging information; and the like.

The platform 92 provides a program operated on the OS (Operating System) (not shown) for invoking the respective functions of the image forming apparatus 1 with the applications 96-1 to 96-$n$, and data. The API, and the like, in the platform 92 are utilized in installing, executing, or uninstalling the applications 96-1 to 96-$n$.

Further, the platform 92 includes services 94-1 to 94-$n$ (FIG. 3), that are programs (classes, routines, functions, and the like) called from the applications 96-1 to 96-$n$, and data related thereto. These services 94-1 to 94-$n$ will be described later.

The storage unit 9 can also store an application by use of an API different from that in the platform 92. For example, the storage unit 9 can store an application software other than the applications 96-1 to 96-$n$ (hereinafter, to be referred to as "an external application"). However, in this case, sharing of information, and the like, which will be described later, cannot be performed.

The applications 96-1 to 96-$n$ are applications configured so as to make it possible to use the functions of the image forming apparatus 1.

The applications 96-1 to 96-$n$ include "general applications", which are installed by the user for invoking each function of the image forming apparatus 1 to implement a desired function, and a "management application" for managing these general applications.

The storage unit 9 may store data for various jobs that have been instructed with the terminal 200 or the operation panel unit 6 of the image forming apparatus 1; image data that has been scanned by the document reading unit 2; image data that has been image-processed by the image processing unit 10; print document data that has been transmitted from the user's terminal; various files that have been read from an external recording medium; thumbnail image data; and the like.

Further, the storage unit 9 may contain an area for a saving folder for each user. Further, in the storage unit 9, an external application may be installed.

{Configuration of Platform 92 and Control Configuration of Application Control Unit 81}

Figure 3:
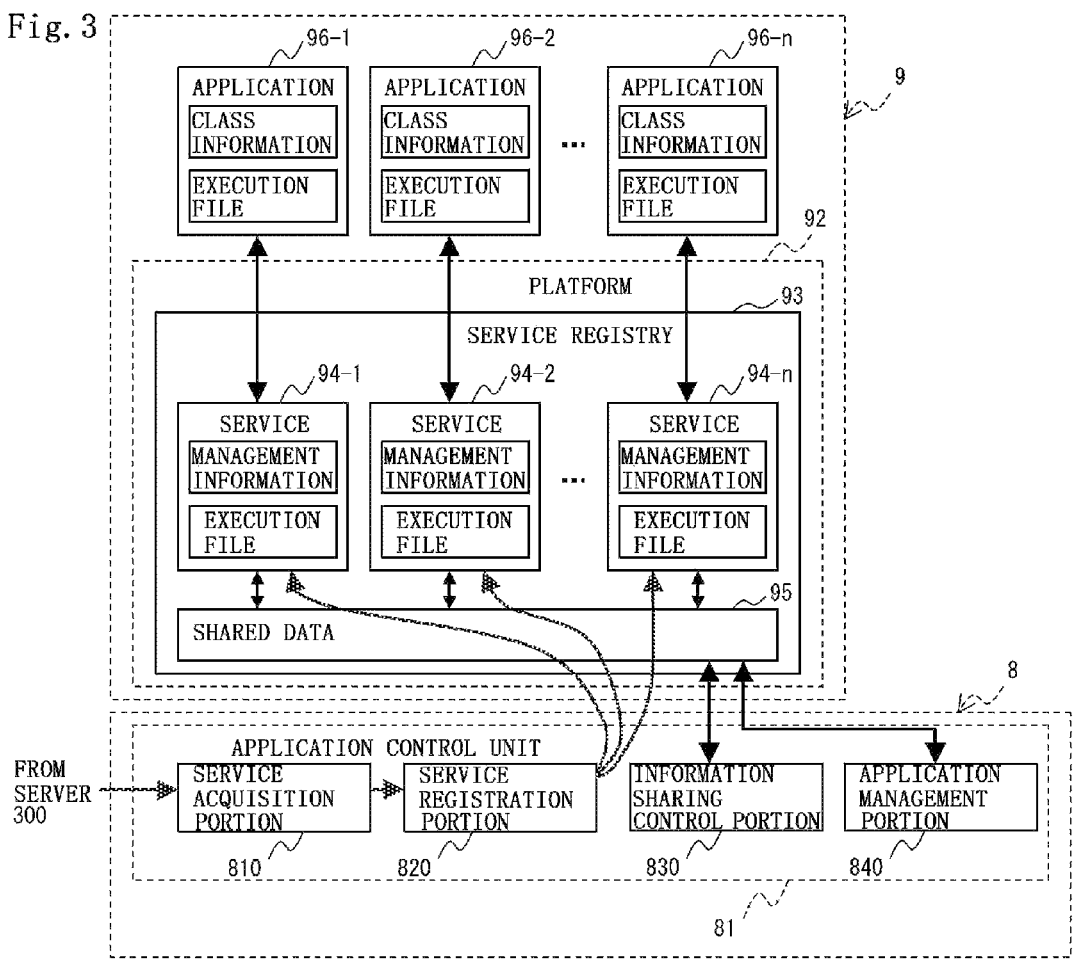
FIG. 3 is a block diagram illustrating a configuration of a platform and a control configuration of an application control unit according to the present disclosure.

Next, with reference to FIG. 3, the details of the configuration of the platform 92 and the control configuration of the application control unit 81 of the image forming apparatus 1 according to the present disclosure will be explained.

The platform 92 includes a service registry 93 as data related to the services.

The application control unit 81 includes a service acquisition portion 810, a service registration portion 820, an information sharing control portion 830, and an application management portion 840.

(Configuration of Platform 92)

The service registry 93 is a data base, and the like, for registering the services 94-1 to 94-$n$.

The service registry 93 can register and delete the services 94-1 to 94-$n$ in association with the applications 96-1 to 96-$n$, respectively, by utilize the API in the platform 92.

Further, the service registry 93 includes shared data 95, which provides a storage area to be shared among the services 94-1 to 94-$n$.

It is preferable that the service registry 93 is allocated in a protected storage area in the storage unit 9. In other words, the service registry 93 may be configured such that it is protected against a direct access from a program other than the services 94-1 to 94-$n$ in the platform 92, and referencing and rewriting it are impossible.

The services 94-1 to 94-$n$ are programs, and the like, which can be called in a share from the applications 96-1 to 96-$n$ that are associated with them. In other words, when the services 94-1 to 94-$n$ are registered in the service registry 93, they are shared with the other applications, and can be called from the other applications. However, the services 94-1 to 94-$n$ cannot be utilized from an external application.

The services 94-1 to 94-$n$ are configured including the management information and the execution files for the callable services.

The management information of the services 94-1 to 94-$n$ includes the information for referencing the class, such as the class-path or the package; the information, such as the explanation of a function or the class name; and the information of the associated applications 96-1 to 96-$n$. This information about the associated applications 96-1 to 96-$n$ may include the information, such as the paths in the file system of the associated applications 96-1 to 96-$n$; the hash information of a file for anti-tampering; the permission of utilization of the services 94-1 to 94-$n$ by the applications 96-1 to 96-$n$; the type of management application or general application; the format of the information to be shared among the services 94-1 to 94-$n$; and the volume of the shared information in the storage area and the location thereof in the memory space. The permission of utilization of the services 94-1 to 94-$n$ by the applications 96-1 to 96-$n$ is configured to provide a setting that, by default, allows it to be utilized also by an application other than the associated applications 96-1 to 96-$n$. It is also possible to set the permission of utilization that can be utilized by a specific application of the applications 96-1 to 96-$n$ alone. In this case, if another application is installed and there is a dependency, the authority of utilization may be set such that it can be called also from the application.

Further, the management information of the services 94-1 to 94-$n$ can include the status of a job executed at the time of execution of the applications 96-1 to 96-$n$, the resource used, the log, and the like. Further, this management information may include the information of the resource used, the include files, and the like.

The execution files for the services 94-1 to 94-$n$ are binary files. The execution files for the services 94-1 to 94-$n$ include the class for sharing information and performing communications among the applications 96-1 to 96-$n$, the class for invoking a specific function of the image forming apparatus 1, and the like. In other words, the functions of the respective units, such as the document reading unit 2, the document feeding unit 3, the main unit 4, the stack tray 5, the operation panel unit 6, the image forming unit 7, the image processing unit 10, the facsimile transmission/reception unit 11, the network transmission/reception unit 12, and the like, can be used by the application control unit 81 calling the associated service 94 from the application 96 for execution.

Hereinbelow, when any one of the services 94-1 to 94-$n$ is to be indicated, it will be simply referred to as the service 94.

The applications 96-1 to 96-$n$ are configured including the execution files that are operated on the platform 92, and various data that include the class information. The applications 96-1 to 96-$n$ are installed by means of a file for installation.

The class information of the applications 96-1 to 96-$n$ provides data for indicating the class identifier of a particular class based on the function to be called; the class-path, the package name, the type of general application or management application, and the like. With the class information of the applications 96-1 to 96-n, the class of the associated services 94-1 to 94-n is called.

The execution files for the applications 96-1 to 96-n are binary files for the applications.

Besides the above data, the applications 96-1 to 96-n may include the necessary data.

Hereinbelow, when any one of the applications 96-1 to 96-n is to be indicated, it will be simply referred to as the application 96.

The applications 96-1 to 96-n are configured such that, if the respective services 94-1 to 94-n are not used, the information cannot be shared or the function for making communications with the other applications cannot be used. Thereby, at the time of installation of the applications 96-1 to 96-n into the image forming apparatus 1, those of a pirated edition can be rejected, which allows the security to be ensured.

As described above, the storage unit 9 functions as an application memory part for storing the applications 96-1 to 96-n, which provide application execution files. Further, the storage unit 9 functions as a service memory part for registering and storing the services 94-1 to 94-n associated with the respective applications 96-1 to 96-n in the service registry 93. Further, the storage unit 9 functions as a platform memory part for storing the platform 92 that provides the API, and the like, for use in execution of the applications 96-1 to 96-n.

(Control Configuration of Application Control Unit 81)

The service acquisition portion 810 acquires the services 94-1 to 94-n from the server 300, or the like, at the time of installation of the applications 96-1 to 96-n. In this case, the service acquisition portion 810 may transmit at least the class information of the applications 96-1 to 96-n to the server 300 to cause the server 300 to select appropriate one of the services 94-1 to 94-n.

The service registration portion 820 stores the services 94-1 to 94-n acquired by the service acquisition portion 810 in the service registry 93 in association with the respective applications 96-1 to 96-n. In this case, since the service registry 93 is a protected area, the service registration portion 820 can store the services 94-1 to 94-n by, for example, the supervisor access, or the like.

The information sharing control portion 830 references the management information of the services 94-1 to 94-n associated with the applications 96-1 to 96-n by the service registration portion 820 to allocate a sharing area in the shared data 95. This sharing area is an area for writing and reading the information to be shared. The information sharing control portion 830 uses the sharing area for causing the information to be shared with the other applications. The information sharing control portion 830 can secure the sharing area in the shared data 95 by the supervisor access, or the like. Further, the information sharing control portion 830 can allocate or release this sharing area in the shared data 95 at the time of start of execution of one of the applications 96-1 to 96-n, upon the service associated with the application being called during the execution, and at the time of execution completion.

At the time of execution of the management application for managing the other applications, the application management portion 840 reads and monitors the sharing area of the shared data 95 that has been allocated by the information sharing control portion 830. The application management portion 840 can permit or not permit the permission of utilization of a service of the services 94-1 to 94-n by one of the applications 96-1 to 96-n that has performed illegal process by rewriting the management information of the service.

Further, the application control unit 81 functions as an installation unit for installing the applications 96-1 to 96-n in the storage unit 9 of the image forming apparatus 1.

Further, the application control unit 81 functions as an application execution unit for expanding the execution files for the applications 96-1 to 96-n to the RAM to execute the execution files. In other words, upon the applications 96-1 to 96-n being executed, the application control unit 81 uses the API provided by the platform 92 for performing function control of the image forming apparatus 1 and information acquisition.

Further, the application control unit 81 reads the services 94-1 to 94-n associated with the respective applications 96-1 to 96-n to expand them to the RAM. The application control unit 81 also functions, upon one of the services 94-1 to 94-n being called from the applications 96-1 to 96-n, as a service execution unit for executing the execution file therefor.

Further, the application control unit 81 also functions, at the time of uninstallation of the applications 96-1 to 96-n, as an installation control unit for performing installation of the services 94-1 to 94-n with reference to the dependency of the services 94-1 to 94-n. Further, the application control unit 81 also functions as an application uninstallation unit for performing control of uninstallation.

[Application Installation Process by Image Forming Apparatus 1]

Figure 4:
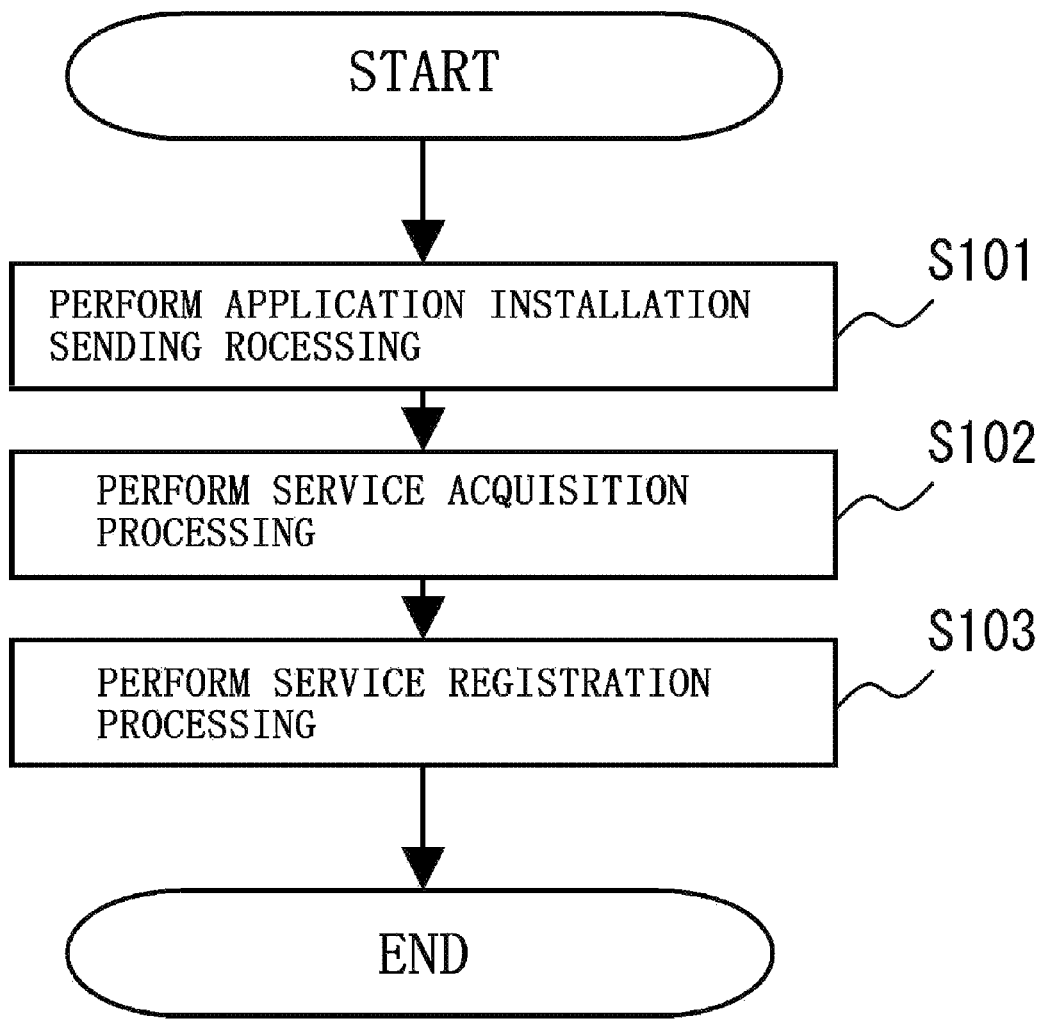
FIG. 4 is a flow chart of application installation process according to the present disclosure.

Here, with reference to FIG. 4, explanation of the application installation process by the image forming apparatus 1 according to the present disclosure will be performed.

In this example, the process in remotely installing the application 96 into the image forming apparatus 1 from the terminal 200 will be explained.

In the application installation process, mainly the control unit 8 executes the program, and the like, stored in the storage unit 9 in cooperation with each unit, using the hardware resource.

Hereinbelow, with reference to a flow chart in FIG. 4, the application installation process will be explained in detail for each step.

(Step S101)

First, the application control unit 81 uses the service acquisition portion 810 to perform application installation sending process.

At the terminal 200, the user uses, for example, an optical drive to cause it to read the application 96 stored in the storage medium for starting a program, such as an installer of the application 96. Then, the terminal 200 uses an application installation unit 220 (FIG. 8) to seek the image forming apparatus 1 on the network 100 for performing logging in thereto.

The application control unit 81 references the account information 90 for performing authentication.

When the authentication is successful, the application control unit 81 acquires the application 96 from the terminal 200 to store it in the storage unit 9 with the API in the platform 92, and write the registration information, and the like.

(Step S102)

Next, the application control unit 81 uses the service acquisition portion 810 to perform service acquisition process.

The application control unit 81 transmits the class information of the application 96 that has been stored in the storage unit 9 to the server 300 for requesting the service 94. In this case, the application control unit 81 may use the user account logged in from the terminal 200 to log in to the server 300.

The server 300 retrieves the necessary service 94 from the data base on the basis of the received class information to transmit it to the image forming apparatus 1.

In this case, if the class information is illegal, error information is returned to the image forming apparatus 1. In the event that the application 96 is of an illegal pirated edition, or the like, it may be notified to the administrator of the server 300 by email, or the like, in addition to the error information being returned.

The application control unit 81 receives the service 94 transmitted from the server 300 with the network transmission/reception unit 12 to store it in the storage unit 9.
(Step S103)

Next, the application control unit 81 uses the service registration portion 820 to perform service registration process.

Upon the service 94 having been acquired, the application control unit 81 utilizes the API in the platform 92 to write it to the management information such that it is associated with the application 96 stored in the storage unit 9. And, the application control unit 81 stores the acquired service 94 in the service registry 93. In this case, the application control unit 81 establishes association of the management information of the service 94 such that the application 96 can utilize the acquired service 94. In other words, as given in an example in FIG. 3, the application control unit 81 stores, in the service registry 93, the service 94-1 in association with the application 96-1, the service 94-2 with the application 96-2, and the service 94-n with the application 96-n.

Further, in the case where the same type of service 94 has already been registered in the service registry 93, the application control unit 81 may associate that service 94 with the application 96. Hereinafter, such a case will be referred to as a "dependency" being given. In other words, in the case where there is given a dependency, the application control unit 81 can perform the process in such a manner as that the application 96-2 is associated with the service 94-1. Likewise, in the case where there is given a dependency, such as inheritance of the class, among the services 94-1 to 94-n, the application control unit 81 also registers that dependency in the service registry 93.

Thereafter, the application control unit 81 transmits the fact that the installation has been completed to the terminal 200. By the above way, the application installation process according to the embodiment of the present disclosure is terminated.

The application control unit 81 can also install the applications 96-1 to 96-n by, for example, connecting a recording medium in which the application 96 is recorded to the image forming apparatus 1. Further, the application control unit 81 can also install the applications 96-1 to 96-n from the server 300.

Further, the application control unit 81 can also record the services 94-1 to 94-n associated with the applications 96-1 to 96-n in a recording medium for directly installing them without accessing the server 300.

Further, the server 300 may encrypt the service 94 such that it can be utilized only from the application 96, and transmit the cryptographic key, or the like.

Further, in the case where the management information of the service 94 is illegal, the application control unit 81 may use the service registration portion 820 to report an error without storing the service 94 in the service registry 93. Further, the application control unit 81 may use the service registration portion 820 to read the equipment settings 91 for determining whether or not there is a function that cannot be used with the class called from the service 94. In this case, the application control unit 81 may report a message, such as "Optional xx is required" or "It is not supported by this model", to the operation panel unit 6 or the terminal 200.

[General Application Execution Process by Image Forming Apparatus 1]

Figure 5:
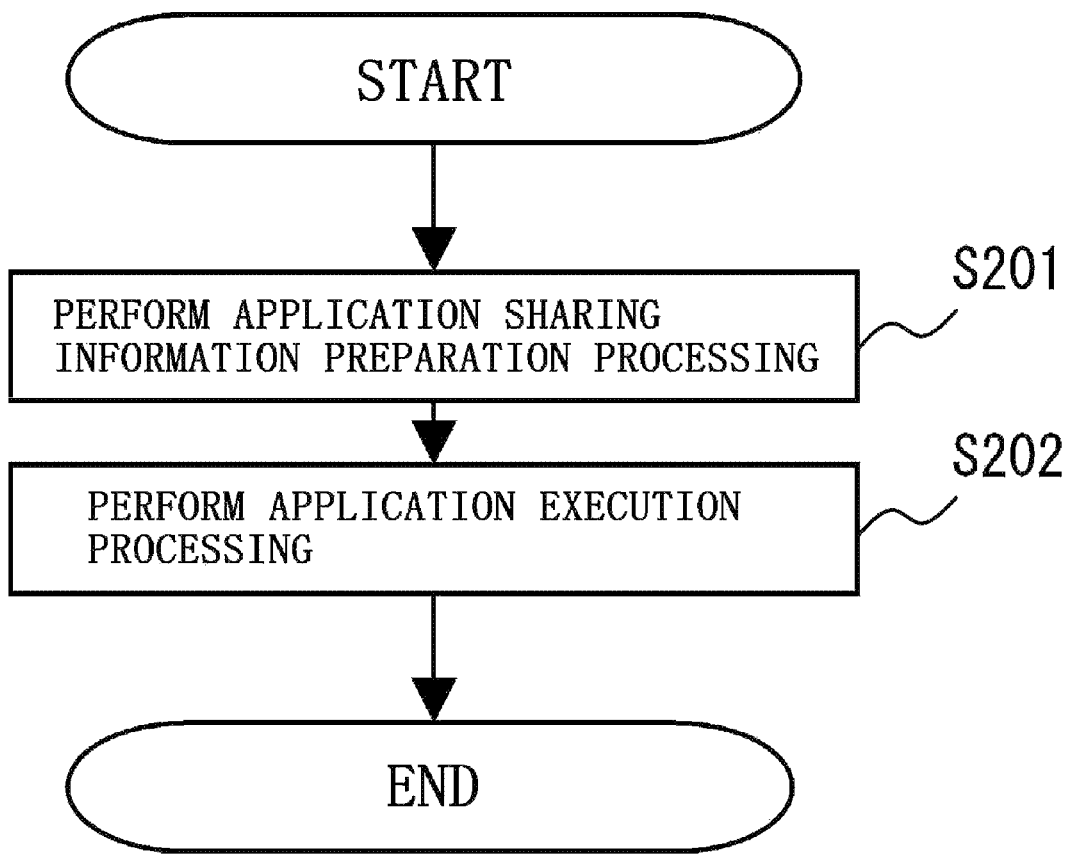
FIG. 5 is a flow chart of general application execution process according to the present disclosure.

Next, with reference to FIG. 5, the details of general application execution process according to the present disclosure will be explained.

In this example, a case where the installed application 96-1, which is a general application, is executed will be explained. The application 96-1, which is a general application, is associated with the service 94-1. Thereby, the application 96-1, which is a general application, can share information with the other applications 96-2 to 96-n, using the service 94-1.

Also in this general application execution process, mainly the control unit 8 executes the program, and the like, stored in the storage unit 9 in cooperation with each unit, using the hardware resource.
(Step S201)

First, the application control unit 81 uses the information sharing control portion 830 to perform application sharing information preparation process.

The application control unit 81 acquires an instruction by the user from, for example, the operation panel unit 6 or the terminal 200. Then, the application control unit 81 starts execution of the application 96-1, which is a general application installed in the storage unit 9.

In this case, prior to execution of the execution file of the application 96-1, the application control unit 81 uses the API in the platform 92 to reference the service registry 93. In this example, the application control unit 81 reads the service 94-1 that has been registered in the service registry 93 at the time of installation of the application 96-1, which is a general application. Then, the application control unit 81 secures a sharing area as an area for shared information within the shared data 95. In this example, on the basis of the management information of the service 94-1, the application control unit 81 allocate a sharing area that is to be used by the service 94-1, being shared with the other services 94-2 to 94-n.
(Step S202)

Next, the application control unit 81 uses the information sharing control portion 830 to perform application execution process.

The application control unit 81 reads the execution file for the application 96-1 from a HDD, or the like, to expand it to the RAM, or the like, for execution.

In this case, the application control unit 81 uses the sharing area in the shared data 95 to cause the information to be shared. In the above example, the application control unit 81 uses the sharing area secured by the service 94-1 to cause the information to be shared with the other services 94-2 to 94-n. The application control unit 81 can cause information, such as the status of a job that has been executed by the application 96-1; the size of the storage area allocated or used in the storage unit 9 by the application 96-1 or the service 94-1; the resource, such as the size of the sharing area; the log of the class of the service 94-1 called from the application 96-1; and the like, to be shared. Further, the application control unit 81 can use this shared information to cause the management application to manage and monitor illegal process of the application 96-1, as described below.

Further, in the case where the class using a function of the image forming apparatus 1 is called by the application 96-1, the application control unit 81 can use the service 94-1 to cause this function to be used. In this case, the application control unit 81 uses the service 94-1 to read the equipment settings 91 for selecting a usable function to perform the process.

By the above way, the general application execution process according to the present disclosure is terminated.

[Management Application Execution Process by Image Forming Apparatus 1]

Figure 6:
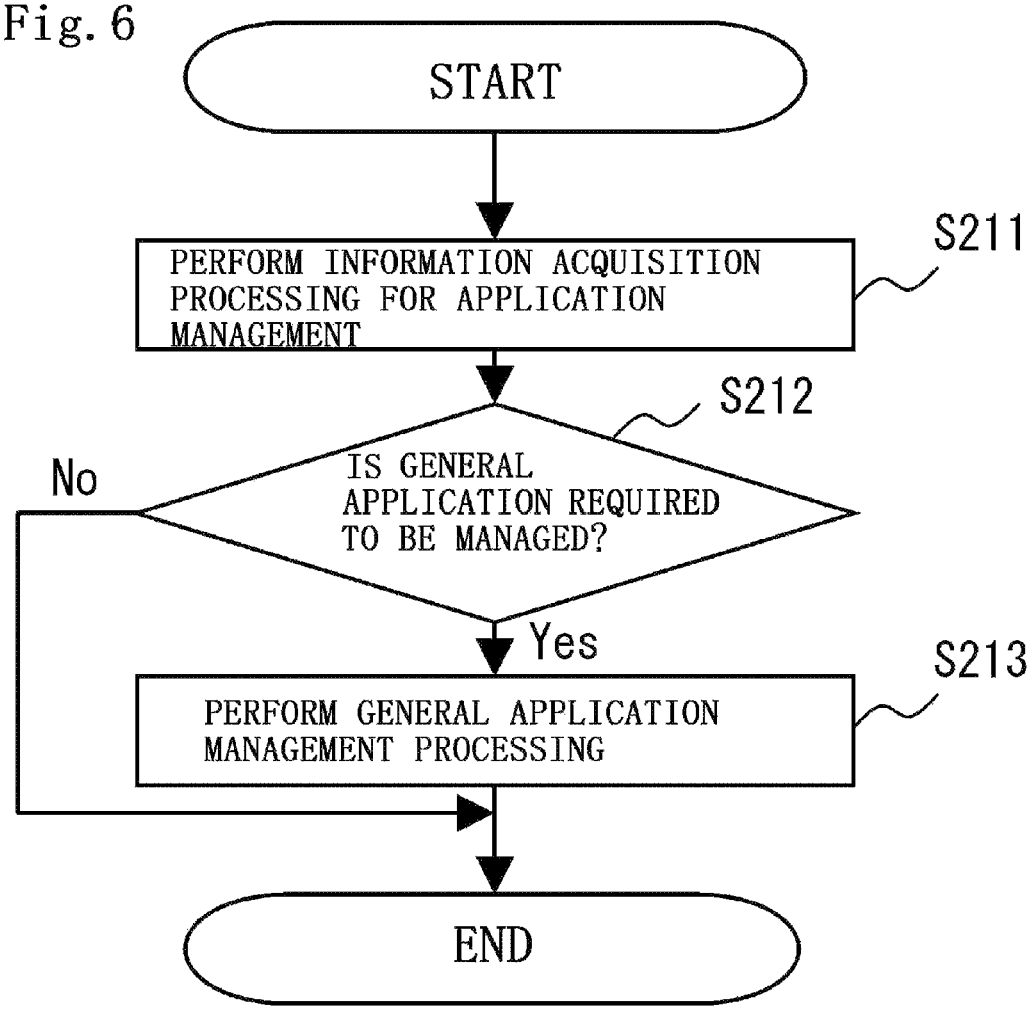
FIG. 6 is a flow chart of management application execution process according to the present disclosure.

Next, with reference to FIG. 6, the details of management application execution process by the image forming apparatus 1 according to the embodiment of the present disclosure will be explained.

In this example, a case where the application 96-2, which is a management application, is executed will be explained. In this management application execution process, the application 96-2 uses the service 94-2 for management to manage and monitor the application 96-1, which is a general application providing the information to be shared. The application 96-2 may be installed into the image forming apparatus 1 at the time of factory shipment, or may be later installed like a piece of "virus detection software".

Also in this management application execution process by the image forming apparatus 1, mainly the control unit 8 executes the program, and the like, stored in the storage unit 9 in cooperation with each unit, using the hardware resource.

(Step S211)

First, the application control unit 81 uses the application management portion 840 to perform information acquisition process for application management.

The application control unit 81 uses a management application to acquire the information of a general application. In this example, the application control unit 81 uses the application 96-2, which is a management application, to monitor the applications 96-1 and 96-3 to 96-n, which are the other general applications here (the other application 96). In this case, the application control unit 81 uses the service 94-2 associated with the application 96-2 to reference the sharing area allocated by the services 94-1 and 94-3 to 94-n (the other services) for acquiring the shared information.

In the case where a sharing area has been allocated by the service 94 associated with the application 96 in the shared data 95, and the shared information is readable, the application control unit 81 references it. In the above example, the application control unit 81 uses, for example, the service 94-2 associated with the application 96-2, which is a management application, to reference the information shared with the service 94-1 associated with the application 96-1. Further, the application control unit 81 can also read or rewrite the management information of the other service 94.

The application control unit 81 uses such shared information or management information to monitor the other application 96, which is a general application. Depending upon the status of the other application 96, the application control unit 81 performs adjustment, release, or acquisition of the volume of the storage area including the sharing area of the storage unit 9, adjustment or allocation of the execution time, order, or the like, of the process, and the like.

Further, the application control unit 81 may use the application 96-2 to determine the illegal application. In conformity with a predetermined heuristic determination criteria, the application control unit 81 also monitors whether the other application 96, which is a general application, is performing illegal process. For example, in the event that the application 96-1, which is a general application, has performed a certain malicious action, the application control unit 81 determines that it is illegal process by using the log of the resource or class, or the like, of the shared information. As this certain malicious action, such a thing as that an attack using an illegal memory operation like buffer overrun has been performed, or that the account information 90 or the printing data has been illegally transmitted from the network 100 can be mentioned as an example.

(Step S212)

Next, the application control unit 81 uses the application management portion 840 to determine whether or not a general application is to be subjected to general application management process. For example, in the case where, on the determination by the application 96-2, which is a management application, it has been determined that the application 96-1, which is one of the general applications, has performed an illegal process, the application control unit 81 makes a determination of Yes. In any other cases, the application control unit 81 makes a determination of No.

If Yes is given, the application control unit 81 advances the process to Step S213.

If No is given, the application control unit 81 terminates the management application execution process.

(Step S213)

In the case where the application 96, which is a general application, has performed the illegal process, the application control unit 81 uses the application management portion 840 to perform general application management process.

The application control unit 81 uses the management application to adjust the sharing area, or the like, of the service 94 for the general application 96, or permit or not permit the permission of utilization of the service 94. For example, in the case where the application 96-1, which is a general application, has performed the illegal process, the application control unit 81 uses the application 96-2, which is a management application, to rewrite the management information of the application 96-1 such that the application 96-1 cannot utilize the service 94-1, thus performing blocking of access, and the like. In this case, the application control unit 81 can give a notification to the application 96-1 by causing the application 96-1 to raise an exception, or otherwise performing.

Further, the application control unit 81 can also stop execution of the general application 96 that has performed the illegal process, write a log to the storage unit 9, or transmit it to the administrator by email.

By the above way, the management application execution process according to the embodiment of the present disclosure is terminated.

In the case where such a function as information sharing, or communication is not to be utilized, the application 96 can also perform the execution with no use of the service 94.

However, it is also possible to configure such that, if the associated service 94 is not available, the application 96 will not be started.

[Application Uninstallation Process by Image Forming Apparatus 1]

Figure 7:
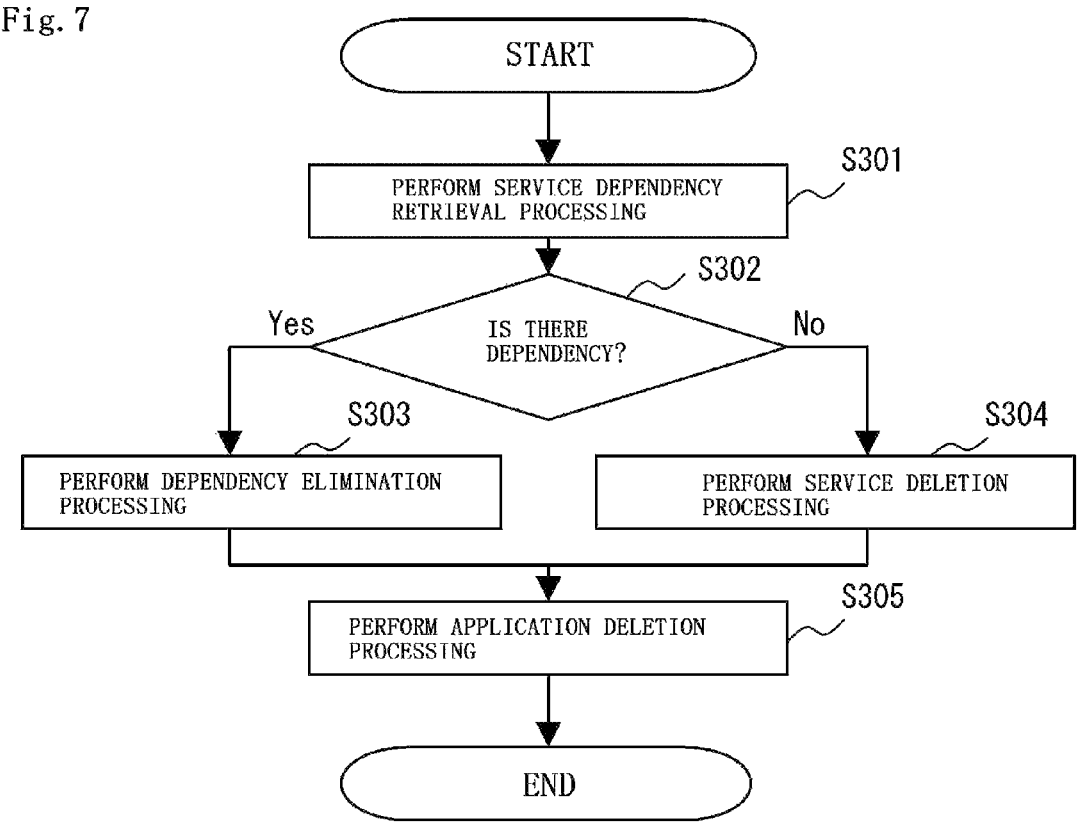
FIG. 7 is a flow chart of application uninstallation process according to the present disclosure.

Next, with reference to FIG. 7, the details of application uninstallation process according to the embodiment of the present disclosure will be explained.

Before performing uninstallation of the application 96, the application control unit 81 considers the dependency of the service 94. In this case, the application control unit 81 modifies the association between the application 96 and the service 94. Hereinbelow, an example in which the application 96-1 is uninstalled will be explained.

Also in the application uninstallation process by the image forming apparatus 1, mainly the control unit 8 executes the program, and the like, stored in the storage unit 9 in cooperation with each unit, using the hardware resource.

(Step S301)

First, the application control unit 81 uses the service registration portion 820 to perform service dependency retrieval process.

The application control unit 81 reads the necessary class information of the other application 96 that is installed. Then, the application control unit 81 seeks the necessary class information to the service 94 associated with the application 96 to be uninstalled can be deleted or not. For example, when the application 96-1 is to be uninstalled, the application control unit 81 seeks whether or not the service 94-1 is used also with the other applications 96-2 to 96-n.

(Step S302)

Next, the application control unit 81 uses the service registration portion 820 to determine whether there has been a dependency. In the case where the service 94 has been used also with the other application 96, the application control unit 81 determines that there is a dependency, giving a determination of Yes. In the above example, in the case where the service 94-1 is used also with any one of the other applications 96-2 to 96-n, a determination of Yes is given. In any other cases, the application control unit 81 determines that there is no dependency, giving a determination of No.

If Yes is given, the application control unit 81 advances the process to Step S303.

If No is given, the application control unit 81 advances the process to Step S304.

(Step S303)

In the case where there has been a dependency, the application control unit 81 uses the service registration portion 820 to perform dependency elimination process.

In the case where there has been a dependency of the service 94, the application control unit 81 uses the API in the platform 92 to rewrite only the management information, leaving the service 94 having had a dependency unchanged.

For example, in the case where, when the application 96-1 is to be uninstalled, the application 96-3 also uses the service 94-1, there having been a dependency, the application control unit 81 deletes the association of the application 96-1 from the management information of the service 94-1. And, the application control unit 81 makes the service 94-1 still usable by the application 96-3.

Thereby, even in the case where there has been a service 94 having a dependency, there is no need for being conscious of it at the time of uninstalling the application 96, and the other application 96 can be continued to be utilized.

Thereafter, the application control unit 81 advances the process to Step S305.

(Step S304)

In the case where there has been no dependency, the application control unit 81 uses the service registration portion 820 to perform service deletion process.

The application control unit 81 uses the API in the platform 92 to delete the service 94 associated with the application 96 to be uninstalled from the service registry 93. In the above example, in the case where an object to be uninstalled is the application 96-1, the application control unit 81 deletes the service 94-1.

Thereafter, the application control unit 81 advances the process to Step S305.

(Step S305)

Here, the application control unit 81 uses the service registration portion 820 to perform application deletion process.

The application control unit 81 uses the API in the platform 92 to delete the application 96 from the storage unit 9, also deleting the registration information.

Further, in this case, the application control unit 81 may notify the server 300 of whether or not the service 94 has been left unchanged. The server 300 can record the notification as a log in the storage unit.

By the above way, the application uninstallation process according to the embodiment of the present disclosure is terminated.

[Application Development Process Using Terminal 200 and Server 300]

Next, with reference to FIG. 8 and FIG. 9, the details of application development process according to the embodiment of the present disclosure will be explained.

Figure 8:
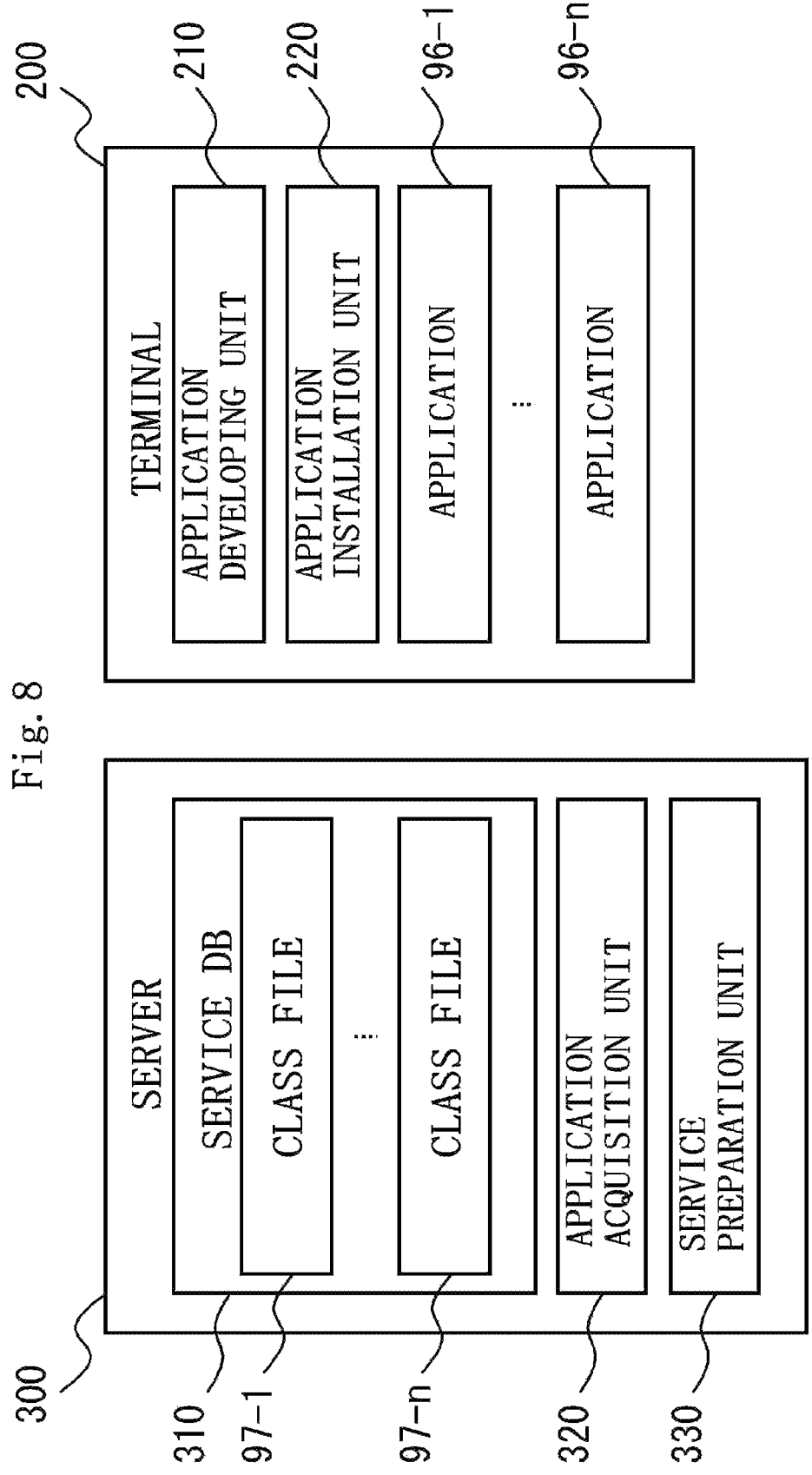
FIG. 8 is a block diagram illustrating a control configuration of a server and a terminal according to the present disclosure.

In FIG. 8, there is given a block diagram illustrating a schematic configuration of the terminal 200 and the server 300 in FIG. 2.

Hereinbelow, an example in which an application 96 is developed using the terminal 200 and the server 300 is given.

Hereinbelow, first, the configuration of the terminal 200 and the server 300 that are required for such application development will be explained.

{Control Configuration of Terminal 200}

The terminal 200 is a user's terminal. Further, the terminal 200 includes hardware resources, such as a control unit, a storage unit, an input unit, a display unit, and a network input/output unit.

In the terminal 200, there is installed an SDK (Software Development Kit) for preparing an application 96 that is executable on the image forming apparatus 1.

The terminal 200 includes an application developing unit 210 (application development unit) and an application installation unit 220 (installation unit) as function blocks.

The application developing unit 210 is a unit for executing an SDK for the platform 92 to prepare applications 96-1 to 96-n.

The application developing unit 210 is capable of preparing a source code of the application 96 for the platform 92, using a source code debugger, or the like, for debugging, and performing compilation, and the like, to prepare an execution file. Further, the application developing unit 210 is capable of preparing class information to include it in the application 96. Further, the application developing unit 210 is also capable of preparing a class for the service 94 in accordance with a predetermined naming rule. Further, the application developing unit 210 is capable of viewing the "already prepared" classes stored in a service DB 310 of the server 300 by referencing class files 97-1 to 97-n using a catalog of the classes.

The application installation unit 220 uses the applications 96-1 to 96-n stored in the storage unit to remotely install the applications 96-1 to 96-n into the image forming apparatus 1.

Upon the remote installation, the application installation unit 220 reads the applications 96-1 to 96-n stored in an external recording medium (not shown) to store them in the storage unit of the terminal 200, and transmits the applications 96-1 to 96-n having been read to the image forming apparatus 1 through the network 100.

Further, the terminal 200 is also capable of performing instruction of a job, such as printing, scanning, remote scanning, or facsimile transmission/reception, to the image forming apparatus 1.

{Control Configuration of Server 300}

The server 300 acquires the application 96 that the user has prepared with the SDK from the terminal 200, and prepares a service 94 to be utilized with this application 96.

The server 300 includes a service DB 310 (service data base), an application acquisition unit 320 (application acquisition unit), and a service preparation unit 330 (service preparation unit).

The service DB 310 is a data base for storing the class files 97-1 to 97-n of the services that are executable on the image forming apparatus 1.

The class files 97-1 to 97-n are, for example, source files of the classes of the services that have been classified by function, package files, object files, executable files, or the like. In the class files 97-1 to 97-*n*, the classes, for example, such as the log output utilizing the API in the platform 92, the XML analysis, and the HTTP communication, are included respectively by function. Further, in the class files 97-1 to 97-*n*, for example, the class identifiers called from the applications 96-1 to 96-*n*, the include paths, the package paths, the links for executing the services, and the like, are also included by function. Since such class identifiers, and the like, are prepared in accordance with a predetermined naming rule, it is possible to prevent classes of a duplicated function from being prepared at the time of development, thereby the development load can be reduced. The administrator of the server 300 can check the class files 97-1 to 97-*n* for freedom from duplication and bugs.

Further, in the service DB 310, there is stored a catalog that provides information, such as the package names of the classes included in the class files 97-1 to 97-*n*, the identification names of the callable classes, and the help information. This catalog can be referenced from the SDK installed into the terminal 200, or the like.

Hereinbelow, when any one of the class files 97-1 to 97-*n* is indicated, it will be simply referred to as the class file 97.

When the applications 96-1 to 96-*n* have been prepared in the terminal 200, the application acquisition unit 320 acquires the class information of the applications 96-1 to 96-*n*. In this case, the application acquisition unit 320 can also acquire not only the class information of the applications 96-1 to 96-*n*, but also the source files, the execution files, and the like.

The application acquisition unit 320 can acquire the class information of the applications 96-1 to 96-*n* also when the applications 96-1 to 96-*n* are installed into the image forming apparatus 1.

On the basis of the information of the classes included in the class information of the applications 96-1 to 96-*n*, the service preparation unit 330 retrieves the class files 97-1 to 97-*n* in units of functions from the service DB 310. When the class files 97-1 to 97-*n* of the services have been retrieved, the service preparation unit 330 prepares services 94-1 to 94-*n* on the basis thereof.

Further, the service preparation unit 330 is also capable of saving the prepared services 94-1 to 94-*n* as the class files 97-1 to 97-*n* of the services in a reusable format in the service DB 310.

Further, the service preparation unit 330 is also capable of transmitting the services 94-1 to 94-*n* associated with the applications 96-1 to 96-*n* to the image forming apparatus 1 or the terminal 200.

The service preparation unit 330 can be implemented by the control unit, such as the CPU, or the like, executing the program stored in the storage unit, such as a HDD or a flash memory.

The service DB 310 can be implemented by using various data base servers for SQL, or the like, which is executed by the control unit of the server 300, for storing data in the storage unit and reading it.

The server 300 may include a data base in which the development account indicating the authority of the development user is stored.

{Details of Application Development Process}

Next, with reference to a flow chart in FIG. 9, the details of application development process by the terminal 200 and the server 300 will be explained.

This application development process is performed in the terminal 200 and the server 300, respectively, with the control unit executing the program, or the like, stored in the storage unit in cooperation with each unit, using the hardware resource.

(Step S401)

First, the application developing unit 210 in the terminal 200 performs application sending process.

When the service 94 is required, the application developing unit 210 transmits the execution file and/or source file of the application 96 that has been prepared by the user with the SDK to the server 300. In this case, the application developing unit 210 adds the class information to the application 96 before transmitting it.

In this case, the application developing unit 210 may use the development account, or the like, to cause the user to be logged in into the server 300.

(Step S402)

Next, the application acquisition unit 320 in the server 300 performs service acquisition process.

The application acquisition unit 320 acquires the execution file and/or source file of the application 96 from the terminal 200 through the network 100. The service preparation unit 330 stores this acquired application 96 once in the storage unit for extracting the class information.

(Step S403)

Next, the service preparation unit 330 in the server 300 performs service preparation process.

The service preparation unit 330 identifies the function to be called by the application 96 from the class information of the application 96 for identifying the necessary class. And, the service preparation unit 330 retrieves the class file 97 including this necessary class from the service DB 310 on the basis of the function to be invoked by the application 96. In this case, the service preparation unit 330 may retrieve the class file 97 by the belonging or authority of the user of the development account.

When the one or a plurality of class files 97-1 to 97-*n* have been retrieved, the service preparation unit 330 can combine or link, and the like, to prepares a service 94, and transmits the prepared service 94 to the terminal 200. This transmitted service 94 may be entered into the management information such that it is used only in the operation confirmation in the image forming apparatus 1.

Here, in the case where the class file 97 has not been retrieved from the service DB 310, the service preparation unit 330 of the server 300 determines whether or not the application 96 itself includes the class based on the function to be called.

In the case where the application 96 itself includes the class, the service preparation unit 330 stores it as a candidate of the class file 97 in the service DB 310. The administrator user of the server 300 can check the candidate of the class file 97, or make some other operation thereon.

Further, the service preparation unit 330 allows the administrator user itself of the server 300 to prepare a class file 97 and store it in the service DB 310.

With such a configuration, a duplicated development of the same service or function can be avoided.

By the above way, the application development process according to the embodiment of the present disclosure is terminated.

{Service Preparation at the Time of Application Installation}

The service preparation unit 330 of the server 300 is also capable of directly preparing a service 94 at the time of application installation. In this case, in Step S101 in FIG. 4, when the class information of the application 96 has been acquired, a corresponding service 94 is prepared on the basis of this class information.

Figure 9:
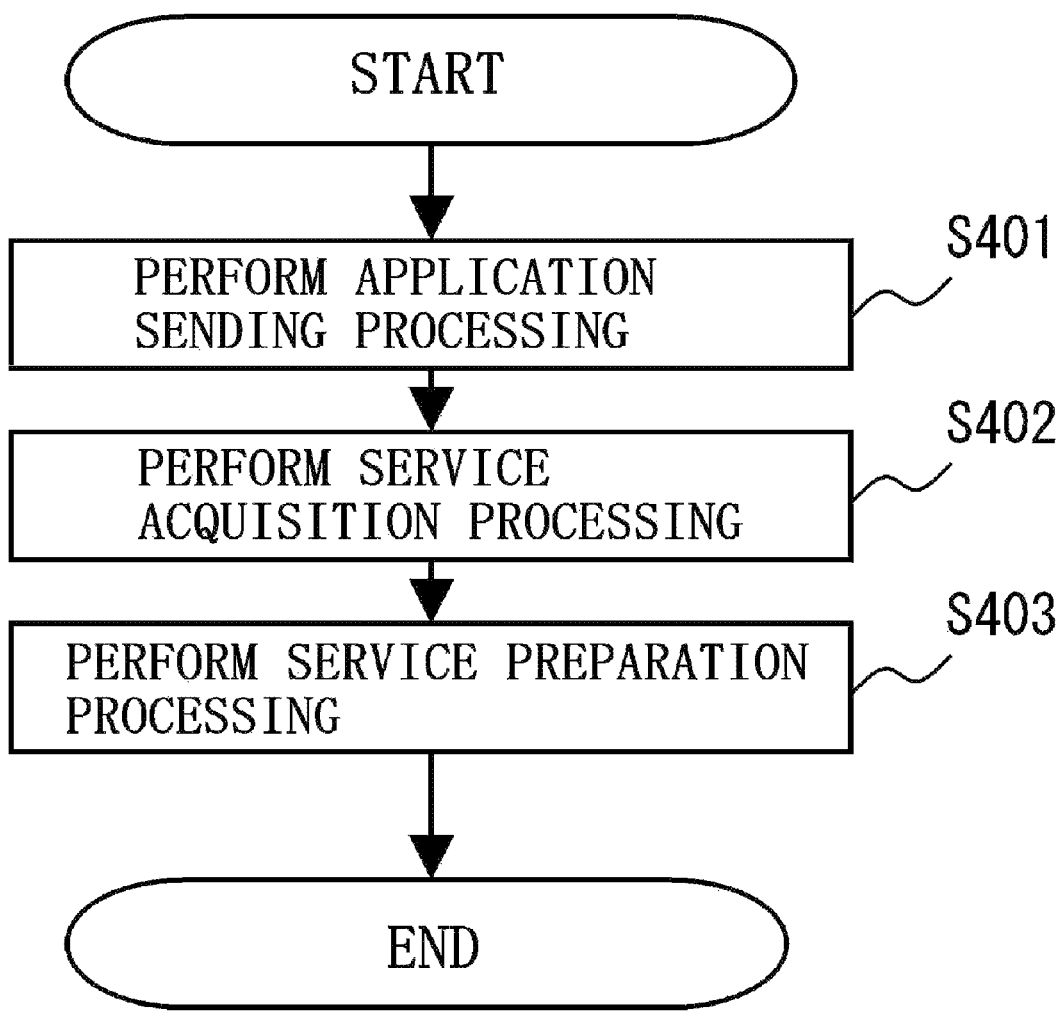
FIG. 9 is a flow chart of application development process according to the present disclosure.

Specifically, the application acquisition unit 320 first acquires at least the class information of the application 96 as in the above service acquisition process in Step S402 in FIG. 9.

On the basis of the received class information of the application 96, the service preparation unit 330 of the server 300 identifies the function to be called by the application 96, and determines whether or not the service 94 is required at the time of execution. In the case where it has been determined that the service 94 is required, the service preparation unit 330 identifies the necessary class thereof.

In the case where the service 94 is required, and there is the necessary class, the service preparation unit 330 retrieves the class file 97 including this necessary class from the service DB 310 on the basis of the function to be called by the application 96.

In the case where there exists the class file 97, which has been retrieved from the service DB 310, the service preparation unit 330 prepares a service 94. The service preparation unit 330 transmits the prepared service 94 to the image forming apparatus 1. In this case, the service preparation unit 330 may encrypt the individual pieces of information, such as the ID, and the like, of the logged-in user, and the date of preparation, to attach them to the management information of the service 94.

In the case where the class information is illegal, the service preparation unit 330 returns error information to the image forming apparatus 1. For example, in the case where the service 94 could not have been retrieved from the service DB 310, the service preparation unit 330 determines that the class information is illegal.

Further, in the event that the application 96 is of an illegal pirated edition, or the like, it may be notified to the administrator of the server 300 by email, or the like, in addition to the error information being returned.

Further, at the time of preparation of a service 94, the service preparation unit 330 of the server 300 may store it in the storage unit of the server 300. The service preparation unit 330 may utilize it in installation of the same application 96.

By configuring the system as above, the following advantages will be obtained.

Conventionally, in the case where, with a conventional image forming apparatus that can execute an application stored in the storage unit, information is to be shared between applications, there has been a problem that there is no other way than using the unit that has been prepared in the OS as a standard.

For example, with the conventional image forming apparatus, the port of the IP (Internet Protocol) has been opened, and the socket communication has been used to share the information between the applications. In other words, the packet to be used by an application has been opened to another application for sharing the information.

Sharing of the information in this way using the method prepared as a standard in the OS has presented a problem of the security risk being increased.

Contrarily to this, an image forming apparatus 1 of the present disclosure includes a service acquisition portion 810 referencing, at the time of installation of applications 96-1 to 96-n, the class information of the applications 96-1 to 96-n to acquire services 94-1 to 94-n from a server 300, or the like; a service registration portion 820 associating the services 94-1 to 94-n acquired by the service acquisition portion 810 with the respective applications 96-1 to 96-n to store them in a service registry 93; and an information sharing control portion 830 causing, upon one of the applications 96-1 to 96-n being executed, the information to be shared with the other applications on the basis of the management information of the services 94-1 to 94-n associated with the applications 96-1 to 96-n by the service registration portion 820.

By thus configuring the system, sharing of information and communication between applications 96 are made possible without relying on the unit prepared in the OS as a standard. In this case, the shared information can be used only between the applications 96. Further, the service 94 cannot be accessed from, for example, illegal programs executed on the web browser other than the application 96 for the image forming apparatus that has been normally installed, and any piece of external equipment. Thereby, it is made possible to reduce the security risk.

Further, the image forming apparatus 1 is required to acquire the service 94 and associate it with the application 96 for storing. In other words, if the service 94 is not available, it becomes impossible to share the information, thereby the security risk can be lowered.

Further, in addition to the information shared between the applications 96, sharing of the service 94 is made possible. Thereby, the resources, such as the storage area of the storage unit 9, and the number of processes that are executed by the control unit 8, can be saved.

In addition, because the class included in the service 94 allows the information to be simply shared between the applications 96, development of an application 96 that requires cooperation with another application 96 can be facilitated.

Further, the image forming apparatus 1 according to the embodiment of the present disclosure permits or not permits the permission of utilization of the services 94-1 to 94-n by the applications 96-1 to 96-n on the basis of the shared data 95 allocated by the information sharing control portion 830.

Thereby, with an application as the management application that is executed on the background, the other general applications can be managed and monitored. In other words, because the management application allows the authority of utilization of the service 94 of the general applications to be established and deleted, a certain malicious action can be detected and inhibited. Further, adjustment, allocation, and automatic management of the resource for the application 96 during execution are made possible.

Thereby, the security risk for the image forming apparatus 1 can be reduced to stabilize the operation.

Further, the server 300 according to the embodiment of the present disclosure includes a service DB 310 storing class files 97-1 to 97-n storing the classes of services 94-1 to 94-n being executable on the image forming apparatus 1; an application acquisition unit 320 acquiring applications 96-1 to 96-n to be executed by the image forming apparatus 1; and a service preparation unit 330 retrieving the service DB 310 on the basis of the function to be called by the acquired applications 96-1 to 96-n, and preparing services 94-1 to 94-n to be called by the applications 96-1 to 96-n on the basis of the retrieved class files 97-1 to 97-n.

Thereby, a duplicated development of a service 94 for the same function can be avoided to make the development more efficient.

Further, the image forming apparatus 1 transmits at least the class information of the application 96 to the server 300. The server 300 verifies the acquired class information of the application 96 to prepare a service 94 one by one for transmission.

Thereby, if the user attempts to install a pirated copy or a tampered or otherwise modified illegal application 96 into the image forming apparatus 1, the server 300 can discover it, and thus distribution of an illegal application 96 can be suppressed.

The present disclosure is also applicable to various information processing apparatuses other than the image forming apparatus. In other words, the configuration provided may be such that it uses such a tool as a network scanner, or a server to which a scanner is separately connected with a USB, or the like. Further, the present disclosure is also applicable to PCs, smart phones, mobile phones, office equipment, and the like, which are information processing apparatuses capable of installing an application.

The configuration and operation of the above embodiment are examples, and of course it is possible to alter them as appropriate for implementation within the scope of the gist of the present disclosure for execution.

What is claimed is:

1. A non-transitory computer-readable recording medium storing a program causing an image forming apparatus executing a plurality of applications stored in a storage unit to function as:
   a service acquisition portion configured to acquire a callable service that is used in a share by said plurality of applications stored in said storage unit,
   a service registration portion configured to store said service acquired by said service acquisition portion in said storage unit in association with one of said plurality of applications,
   an information sharing control portion configured to share information provided by said service associated by said service registration portion to be shared between said service and another service stored in said storage unit, and
   an application management portion that, on the basis of the information shared by the information sharing control portion, non-permits an authority of utilization of the service by one of said plurality of applications that has performed illegal process, wherein:
   the information sharing control portion is configured to use a sharing area in shared data to cause the information to be shared, and
   the information shared by the information sharing control portion includes at least one of:
      a status of a job that has been executed by the application,
      the size of a storage area allocated or used in the storage unit by the application or the service,
      the resource,
      the size of the sharing area, and
      the log of a class of the service called from the application.

2. An image forming apparatus executing a plurality of applications stored in a storage unit, comprising:
   a service acquisition portion configured to acquire a callable service that is used in a share by said plurality of applications stored in said storage unit
   a service registration portion configured to store said service acquired by said service acquisition portion in said storage unit in association with one of said plurality of applications,
   an information sharing control portion configured to share information provided by said service associated by said service registration portion to be shared between said service and another service stored in said storage unit, and
   an application management portion configured to, on the basis of the information shared by said information sharing control portion, non-permit the authority of utilization of said service by one of said plurality of applications that has performed an illegal process, wherein:
   the information sharing control portion is configured to use a sharing area in shared data to cause the information to be shared; and
   the information shared by the information sharing control portion includes at least one of:
      a status of a job that has been executed by the application,
      the size of a storage area allocated or used in the storage unit by the application or the service,
      the resource,
      the size of the sharing area, and
      the log of a class of the service called from the application.

3. An image forming method, being implemented by an image forming apparatus executing a plurality of applications stored in a storage unit, the method comprising:
   acquiring a callable service that is able to be used in a share by said plurality of applications,
   storing said acquired service that is in association with one of said plurality of applications,
   sharing information provided by said service between the service and another service stored, and
   on the basis of the information shared by the information sharing control portion, non-permitting an authority of utilization of the service by one of said plurality of applications that has performed illegal process wherein:
   the step of sharing information comprises using a sharing area in shared data to cause the information to be shared, and
   the information shared includes at least one of:
      a status of a job that has been executed by the application,
      the size of a storage area allocated or used in the storage unit by the application or the service,
      the resource,
      the size of the sharing area, and
      the log of a class of the service called from the application.

* * * * *